United States Patent
Weiland et al.

(10) Patent No.: US 12,447,530 B2
(45) Date of Patent: Oct. 21, 2025

(54) ATOMIZATION UNIT FOR ATOMIZING METAL MELTS, IN PARTICULAR FOR POWDER-METALLURGICAL PURPOSES

(71) Applicant: SMS group GmbH, Düsseldorf (DE)

(72) Inventors: Peter Weiland, Dortmund (DE); Norbert Vogl, Ratingen (DE); Reiner Pürling, Hönningen (DE); Lukas Gellings, Viersen (DE)

(73) Assignee: SMS group GmbH, Düsseldorf (DE)

( * ) Notice: Subject to any disclaimer, the term of this patent is extended or adjusted under 35 U.S.C. 154(b) by 76 days.

(21) Appl. No.: 18/693,131

(22) PCT Filed: Nov. 2, 2022

(86) PCT No.: PCT/EP2022/080526
§ 371 (c)(1),
(2) Date: Mar. 18, 2024

(87) PCT Pub. No.: WO2023/078911
PCT Pub. Date: May 11, 2023

(65) Prior Publication Data
US 2025/0128321 A1 Apr. 24, 2025

(30) Foreign Application Priority Data
Nov. 3, 2021 (DE) ...................... 10 2021 212 367.8

(51) Int. Cl.
*B22F 9/08* (2006.01)

(52) U.S. Cl.
CPC ........ *B22F 9/082* (2013.01); *B22F 2009/088* (2013.01)

(58) Field of Classification Search
CPC .......................... B22F 9/082; B22F 2009/088
See application file for complete search history.

(56) References Cited

U.S. PATENT DOCUMENTS

| | | | |
|---|---|---|---|
| 4,449,902 A | 5/1984 | Ramser | |
| 4,534,917 A | 8/1985 | Walz | |
| 4,822,267 A | 4/1989 | Walz | |
| 5,366,204 A | 11/1994 | Gigliotti et al. | |

FOREIGN PATENT DOCUMENTS

| | | | |
|---|---|---|---|
| CH | 435574 A * | 5/1967 | ........... B05B 7/1666 |
| DE | 3533964 C1 | 1/1987 | |
| DE | 3311343 C2 | 4/1987 | |
| DE | 10044364 C1 | 1/2002 | |
| DE | 4011392 B4 | 4/2004 | |
| DE | 10340606 B4 | 10/2005 | |
| DE | 19738682 B4 | 10/2006 | |
| DE | 102021208605 A1 | 2/2023 | |
| EP | 0451552 B1 | 4/1997 | |
| JP | 2019059989 B | 8/2021 | |

\* cited by examiner

*Primary Examiner* — JaMel M Nelson
(74) *Attorney, Agent, or Firm* — Smartpat PLC

(57) ABSTRACT

An atomization unit (1) for atomizing metal melts, in particular for powder-metallurgical purposes, includes a crucible (2) having a base outlet (4). A melt nozzle (16) is arranged below the base outlet (4) and a gas nozzle (9) is preferably arranged concentrically with respect to the melt nozzle (16). The melt nozzle (16) is formed in multiple parts and comprises a casing body along with a nozzle core (17). The nozzle core (17) passes through a conical seat within the casing body.

10 Claims, 2 Drawing Sheets

ATOMIZATION UNIT FOR ATOMIZING METAL MELTS, IN PARTICULAR FOR POWDER-METALLURGICAL PURPOSES

CROSS-REFERENCE TO RELATED APPLICATION

This application is a national stage application, filed under 35 U.S.C. § 371, of International Patent Application PCT/EP2022/080526, filed on Nov. 2, 2022, which claims the benefit of German Patent Application DE 10 2021 212 367.8, filed on Nov. 3, 2021.

TECHNICAL FIELD

The disclosure relates to an atomization unit for atomizing metal melts, in particular for powder-metallurgical purposes, comprising a crucible with a base outlet, a melt nozzle that is arranged below the base outlet and a gas nozzle that is arranged concentrically with respect to the melt nozzle.

BACKGROUND

An atomization unit for atomizing metal melts is known, for example, from DE 10 044 364 C1. The atomizer assembly known from this publication comprises a crucible with a base outlet, a support crucible surrounding the crucible with a wall and a coaxial base opening. The atomization unit further comprises a melt nozzle for generating a melt jet and a nozzle body allocated to the melt nozzle, in which a ring slot nozzle concentric with respect to the melt nozzle is arranged, and at least one gas channel for supplying the ring slot nozzle with an atomizing gas. With the arrangement according to DE 10 044 364 C1, a cooling of the melt is prevented by the fact that the support crucible and the nozzle body are surrounded by thermal insulation and that an induction coil for heating the melt, melting crucible, support crucible and nozzle body is arranged outside the thermal insulation and that the gas channel for preheating the atomizing gas is passed through the wall of the support crucible.

Further prior art is known from the publications DE 33 113 43 A1, DE 35 339 64 C1, DE 40 113 92 A1, DE 197 386 82 A1, U.S. Pat. No. 5,366,204 A and JP 2019059989. The prior art, in particular the prior art according to DE 100 443 64C1, has the disadvantage that the crucible and the melt therein are heated, and that also the preheating of the atomizing gas is effected by a single external induction coil, which affects heating through a thermal insulation that surrounds the support crucible and the nozzle body on the outside.

SUMMARY

Known atomization unit for atomizing metal melts are structurally complex, in particular if they include a crucible that is surrounded by a support crucible through which a gas channel for a ring slot nozzle passes.

In contrast, the present disclosure provides an atomization unit of the type mentioned at the beginning, which is more compact and simpler in design. Furthermore, the disclosure provides such an atomization unit with relatively low insulation effort, with which solidification of the melt is nevertheless reliably prevented.

A cooling of the melt below the solidus temperature jeopardizes the process reliability of the powder atomization system in which the atomization unit is typically operated. With powder atomization systems using an atomization unit of the type mentioned above, quasi-continuous operation is economically sensible and desirable. Therefore, the process reliability of such a unit is a substantial quality criterion. In addition, an atomization unit should be designed as simply as possible, such that simple and rapid maintenance of the melt nozzle is possible.

One aspect of the invention relates to an atomization unit for atomizing metal melts, in particular for powder-metallurgical purposes. The atomization unit comprises a crucible with a base outlet. A casting nozzle is arranged below the base outlet. A gas nozzle that is arranged concentrically with respect to the melt nozzle. The melt nozzle is formed in multiple parts and comprises a casing body along with a nozzle core. The nozzle core passes through a conical seat in the casing body. The casing body provides thermal insulation of the nozzle core, in particular because it rests against the nozzle core over a substantial part of the casing surface of the nozzle core and at least partially encloses it. In addition, the casing body provides a mechanical stabilization of the nozzle core. The nozzle core is preferably interchangeably inserted into the casing body and is held by it.

Preferably, the casing body is formed as a perforated brick, which has a conical passage as a seat for the nozzle core. The nozzle core can be formed in such a manner that it protrudes/projects from the casing body in the region of a nozzle tip. In such region, the melt nozzle can extend into a gas nozzle body. The gas nozzle body can be formed in multiple parts and form a ring slot nozzle for the atomizing gas with the nozzle core.

Preferably, the casing body is formed to be heatable, such that the nozzle core can be heated indirectly in this manner. The casing body is expediently thermally coupled directly to the nozzle core.

With a preferred variant of the atomization unit, it is provided that the nozzle core is held between the casing body and a base of the crucible.

The nozzle core can, for example, have a circumferential collar with which the nozzle core is held concentrically and in a positive-locking manner in the conical seat of the casing body. For this purpose, the seat of the casing body can form a circumferential cylindrical shoulder on its side facing the crucible, into which the collar of the nozzle core fits.

The casing body can, for example, comprise at least one resistance heating element embedded in it. The resistance heating element can be formed as a helical conductor, which can be completely embedded in the material of the casing body in such a manner that the resistance heating element forms a conical enclosure of the hole passing through the casing body. It is provided that the crucible is also heated by a resistance heating element, which encloses a casing surface of the crucible.

In addition, it can be provided that the casing body of the melt nozzle comprises at least one heating body, which preferably rests against a contact surface of the casing body. The heating body can be formed as a heating pad, for example.

Preferably, the heating body is embedded in the casing body between the casing body and a gas nozzle body of the gas nozzle. For example, one or more heating bodies can be integrated into the base of the casing body of the melt nozzle.

The heating body is preferably formed as a ceramic heating element. The ceramic heating element can, for example, consist entirely of a silicon nitride or an aluminum nitride. In particular, the heating element can be formed as a hot-pressed silicon nitride ring, which is inserted into a complementary base-side recess of the casing body, for example. Preferably, the heating body is in heat-conducting contact with both the casing body and the gas nozzle body, such that, in this manner, a heating of both the casing body and the gas nozzle body, and thus also the heating of the atomizing gas flowing through the gas nozzle body, are possible.

It is provided that the melt nozzle is heated directly by a heating coil provided in the perforated brick and that the gas nozzle body is heated directly by a heating body/a heating pad that is located between the perforated brick and an upper part/an upper side of the gas nozzle body.

With a preferred and expedient variant of the atomization unit, it is provided that the outer contour of the nozzle core forms a parting line with the crucible and with the casing body, which is formed as a labyrinth seal, such that material penetrating into the parting line from the base outlet solidifies through multiple diversion within the parting line, thus forming a reliable seal.

The invention is explained below with reference to an exemplary embodiment shown in the drawings.

DETAILED DESCRIPTION

Figure 1:
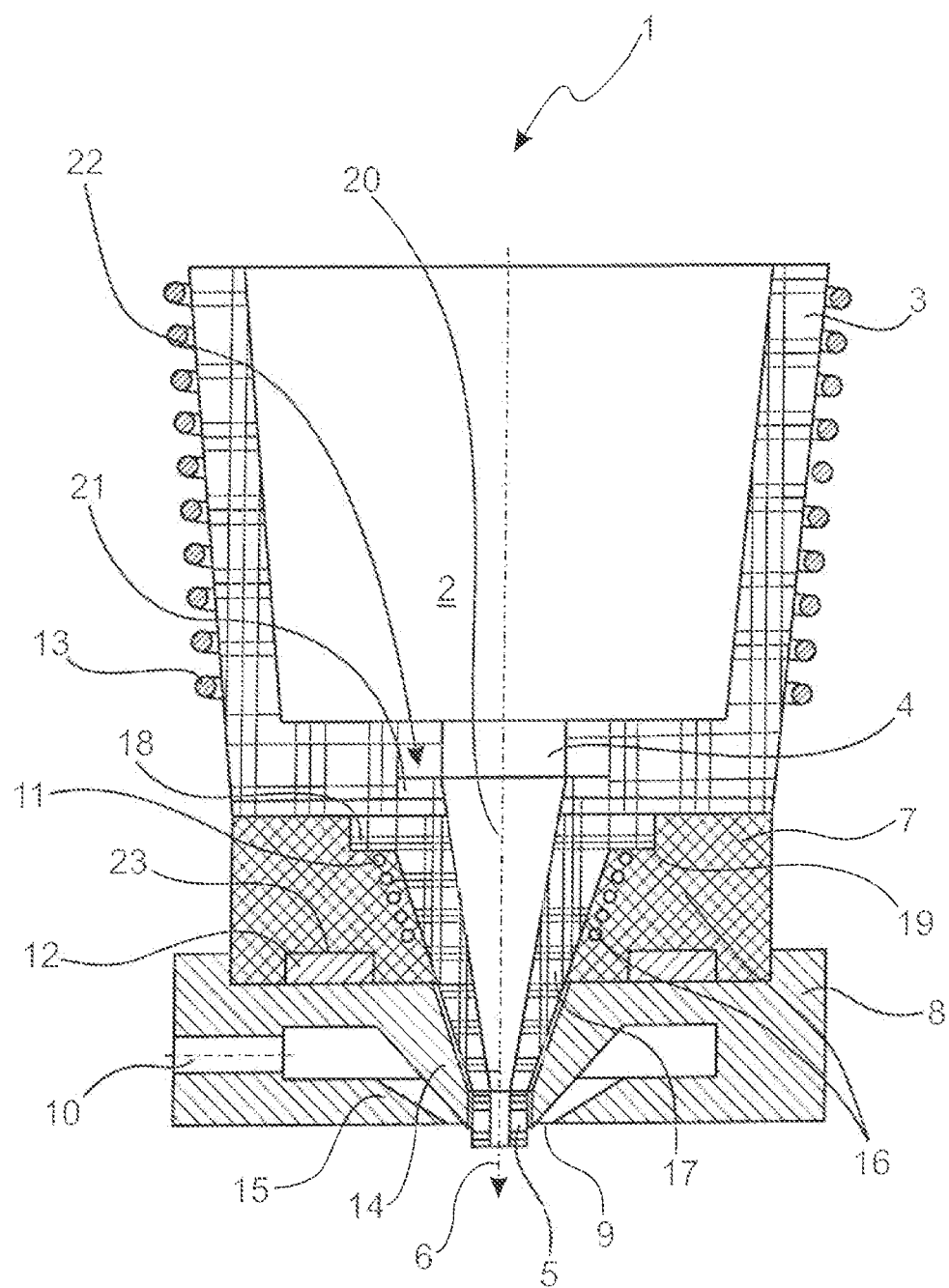
FIG. 1 is a sectional view through an atomization unit.

The atomization unit 1 shown in section in FIG. 1 comprises a crucible 2 made of a refractory material with a wall 3. The casing surface of the crucible 2 and thus the wall 3 is enclosed by a crucible heater 13, which causes a heating of the crucible 2 and indirectly of a melt pool located in the crucible 2. The crucible heater 13 can be a resistance heater, but it can also be designed as an induction heater, which heats the crucible 2 by means of a graphite susceptor. The crucible 2 comprises a base outlet 4, to which a multi-part melt nozzle 16 is connected. The melt nozzle 16 comprises a perforated brick 7 as a casing body and a nozzle core 17, which is inserted into the casing body/into the perforated brick 7. The perforated brick 7 forms a conical seat for the nozzle core 17 formed complementary to this, which fits into the conical seat of the perforated brick 7 with a circumferential collar 18. The collar 18 is supported on a cylindrical shoulder 19 of the perforated brick 7. The nozzle core 17 is interchangeably inserted into the perforated brick 7. Furthermore, the nozzle core 17 comprises a cylindrical flange 21, which fits into a correspondingly shaped recess 22 at the base of the crucible 2. The perforated brick 7 and the base of the crucible 2 form a casing on both sides of the nozzle core 17, which passes through the perforated brick 7, and is thereby fixed in a positive-locking manner.

The base outlet 4 of the crucible 2 and the nozzle core 17 form a melt channel 20, which forms a nozzle tip 5 at the leading end of the nozzle core 17. The leading end of the nozzle core 17 extends through a gas nozzle body 8, which is composed of an upper nozzle part 14 and a lower nozzle part 15 and forms a ring slot nozzle 9 on the casting nozzle, via which an atomizing gas is fed to the jet of molten metal emerging from the nozzle tip 5 and thereby causes dispersion/atomization of the melt to form a metal powder. The nozzle tip 5 opens into an atomization tower, not shown, in which the metal powder is collected. The atomizing gas is fed radially through the gas nozzle body via a gas channel 10.

The perforated brick 7, which provides thermal insulation and mechanical stabilization of the nozzle core 17, comprises a heating coil 11, which consists, for example, of one or more resistance heating elements and which is embedded in the perforated brick 7 near the nozzle core 17. An application of current to the heating coil 11 causes a direct warming of the perforated brick 7 and an indirect warming of the interchangeable nozzle core 17 by means of heat conduction.

Figure 2:
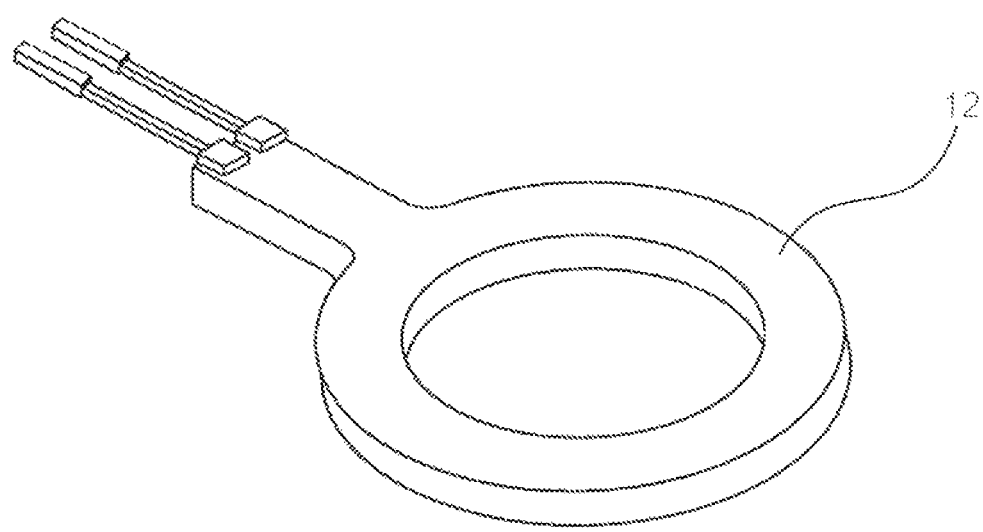
FIG. 2 is a perspective view of a heating body of the atomization.

Furthermore, the melt nozzle 16 comprises a heating body 12, which is formed as a fully ceramic, preferably ring-shaped heating element and forms a type of heating pad. The heating body is shown in perspective in FIG. 2. The heating body 12 fits into a corresponding ring-shaped recess 23 in the base of the perforated brick and is in heat-conducting contact both with the perforated brick 7 and with the upper nozzle part 14 of the gas nozzle body 8. The heating body 12 can consist of a silicon nitride, for example, and upon the application of current via a voltage source causes a direct heating/warming of the gas nozzle body 8 and the perforated brick 7 and, via this, an indirect warming of the nozzle core 17 and the atomizing gas flowing through the gas nozzle body 8.

LIST OF REFERENCE SIGNS

1 Atomization unit
2 Crucible
3 Wall of the crucible
4 Base outlet
5 Nozzle tip
7 Perforated brick of the melt nozzle
8 Gas nozzle body
9 Ring slot nozzle
10 Gas channel
11 Heating coil
12 Heating body
13 Crucible heater
14 Upper nozzle part of the gas nozzle
15 Lower nozzle part of the gas nozzle
16 Melt nozzle
17 Nozzle core of the melt nozzle
18 Collar of the nozzle core
19 Shoulder of the conical sealing seat
20 Melt channel
21 Flange of the nozzle core
22 Recess in the base of the crucible
23 Recess in the base of the perforated brick

The invention claimed is:

1. An atomization unit (1) for atomizing metal melts, comprising:
   a crucible (2) having a base outlet (4);
   a melt nozzle (16) that is arranged below the base outlet (4); and
   a gas nozzle (9) that is arranged concentrically with respect to the melt nozzle (16),
   wherein the melt nozzle (16) is formed in multiple parts and comprises
   a casing body and
   a nozzle core (17),
   wherein the nozzle core (17) passes through a conical seat inside the casing body,
   wherein the casing body comprises a heating body (12), and
   wherein the heating body (12) rests against a contact surface of the casing body.

2. The atomization unit (1) according to claim 1, wherein the casing body is a perforated brick (7).

3. The atomization unit (1) according to claim 1, wherein the nozzle core (17) is held between the casing body and a base of the crucible (2).

4. The atomization unit (1) according to claim 1, wherein the nozzle core (17) is held concentrically and in a positive-locking manner in the conical seat of the casing body by a circumferential collar (18).

5. The atomization unit (1) according to claim 1, wherein the casing body comprises at least one resistance heating element embedded therein.

6. The atomization unit (1) according to claim 1, wherein the heating body (12) is formed as a heating pad and is embedded between the casing body and a gas nozzle body (8) of the gas nozzle.

7. The atomization unit (1) according to claim 1, wherein the heating body (12) is a ceramic heating element.

8. The atomization unit (1) according to claim 6, wherein the heating body (12) is inserted into a base-side recess of the casing body and is in heat-conducting contact with both the casing body and the gas nozzle body (8).

9. The atomization unit (1) according to claim 1, wherein an outer contour of the nozzle core (17) forms a parting joint with the crucible (2) and with the casing body, and
wherein the parting joint is formed as a labyrinth seal.

10. The atomization unit (1) according to claim 1, wherein the atomization unit (1) is configured for atomizing metal melts for powder-metallurgical purposes.

* * * * *